(12) United States Patent
Leboisne et al.

(10) Patent No.: US 6,195,993 B1
(45) Date of Patent: Mar. 6, 2001

(54) MASTER CYLINDER WITH HYDRAULIC REACTION AND SELECTIVE SELF-POWERING

(75) Inventors: Cedric Leboisne; Jean-Paul Bentz, both of Paris; Bruno Berthomieu, Drancy; Juan Simon Bacardit, Drancy; Fernando Sacristan, Drancy, all of (FR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/367,679
(22) PCT Filed: Jul. 12, 1999
(86) PCT No.: PCT/FR99/01704
§ 371 Date: Aug. 16, 1999
§ 102(e) Date: Aug. 16, 1999
(87) PCT Pub. No.: WO00/03903
PCT Pub. Date: Jan. 27, 2000

(30) Foreign Application Priority Data

Jul. 16, 1998 (FR) .................................................. 98 09084

(51) Int. Cl.[7] ................................................. B60T 13/132
(52) U.S. Cl. ............................................................. 60/553
(58) Field of Search ....................................... 60/552, 553

(56) References Cited

U.S. PATENT DOCUMENTS

| | | | |
|---|---|---|---|
| 2,862,366 | * 12/1958 | Ingres et al. .......................... | 60/553 |
| 4,091,619 | * 5/1978 | Carre et al. ............................ | 60/553 |
| 4,172,364 | * 10/1979 | Young .................................... | 60/550 |
| 4,179,980 | * 12/1979 | Kito et al. .......................... | 60/553 X |
| 4,660,381 | * 4/1987 | Kuromitu ............................ | 60/553 X |
| 5,921,084 | * 7/1999 | Gautier et al. ......................... | 60/553 |
| 5,941,071 | * 8/1999 | Simon Bacardit ...................... | 60/553 |
| 6,079,208 | * 6/2000 | Verbo et al. ............................. | 60/553 |
| 6,082,109 | * 7/2000 | Simon Bacardit ...................... | 60/553 |
| 6,085,522 | * 7/2000 | Simon Bacardit ...................... | 60/553 |

* cited by examiner

Primary Examiner—John E. Ryznic
(74) Attorney, Agent, or Firm—Lee H McCormick Jr; Warren Comstock

(57) ABSTRACT

The invention relates to a master cylinder with hydraulic reaction for a pneumatic brake booster, comprising a main piston (12) receiving a boost force, and a reaction piston (3), mounted so that it can slide in a reaction chamber (4) of the main piston and receiving an actuating force.

The master cylinder of the invention also comprises a seat support (7) against which the reaction piston (3) can press and which is mounted so that it can slide towards a low-pressure chamber, the reaction piston (3) and this seat support in combination constituting a stepped assembly in the reaction chamber (3) capable of receiving, from the pressure in the reaction chamber (3), a force which combines with the braking effort after a sharp application of the brakes.

9 Claims, 4 Drawing Sheets

MASTER CYLINDER WITH HYDRAULIC REACTION AND SELECTIVE SELF-POWERING

The present invention relates to a master cylinder with hydraulic reaction for a pneumatic brake booster comprising: a body pierced with a main bore; a cylindrical main piston pierced with a secondary bore, and of which one end, outside the body, can receive a boost force directed in a first direction, this main piston being mounted so that it can slide, without leaking, in the main bore in order therein to delimit a working chamber which during operation is subjected to a hydraulic pressure; and a reaction piston of which a first end, outside the body, is capable of receiving an actuating force directed in the first direction, and of which a second end is mounted so that it can slide, without leaking, by virtue of a first annular seal, in the secondary bore in order therein to delimit at least a first reaction chamber that communicates with the working chamber, the reaction piston being capable of moving, with respect to the main piston, through a travel of non-zero minimum amplitude for an actuation force gradient that exceeds a given threshold.

A master cylinder of this type is described, for example, in patent FR-2,724,354.

Devices of this type have been developed very recently for their ability to overcome the dynamic shortcomings of pneumatic brake boosters.

Now it is known that pneumatic brake boosters which are used to provide a force to assist with braking which is added to the actuating force exerted by the driver on the brake pedal and is in theory proportional to this force, have the shortcoming of being able to develop this boost force only after a certain delay compared with the actuating force.

As the boost force is the result of the difference between the pneumatic pressures prevailing, on the one hand, in a front chamber of the booster, this chamber being connected to a source of partial vacuum, and, on the other hand, in a rear chamber which is connected to the atmosphere during braking, and as the delay in the boost force compared with the actuating force is due to a limit on the rate at which atmospheric air is let into the rear chamber through the booster inlet valve at the time of braking, this delay is longer, the more abrupt the braking.

Now, the situations in which braking is rapid are generally emergency situations in which the driver would, by contrast, specifically need the greatest possible boost force as early as possible.

These considerations have quite recently led to the development of master cylinders with hydraulic reaction which, on the one hand, allow the booster inlet valve to open wider and therefore allow an increased air flow rate and, on the other hand, allow a dynamic modulation of the reaction force, that is to say a modulation as the function of the rate of brake application of the fraction of the boost force with which the reaction master cylinder opposes the actuating force in order to adjust the boost force as a function of this actuating force.

Using devices described in documents which have not been pre-published, it is thus possible considerably to reduce the reaction force in the event of emergency braking, compared with the value it would have for normal braking, and this allows a corresponding increase in the braking force available for emergency braking situations.

However, a problem still encountered in developing these devices lies in the fact that most drivers, caught out by the deceleration, tend to release their braking effort far too early in a panic situation, which means that it is advisable, after a sharp application of the brakes, for the drop in braking effort to be compensated for, in order to reduce or cancel the negative effects of this dangerous reflex.

The object of the present invention is to put forward a solution to this problem.

To this end, the master cylinder of the invention, which in other respects is in accordance with the preamble above, is essentially characterized in that it further comprises: a first shut-off seat formed on a front face of the second end of the reaction piston; a second shut-off seat mounted at a first end of a seat support placed in the first reaction chamber, at a distance from the first shut-off seat that is at most equal to the said minimum-amplitude travel; and at least a first spring urging the reaction piston in a direction likely to move the first shut-off seat away from the second shut-off seat, in that the seat support has a second end sliding, without leaking, in the main piston by virtue of a second annular seal, this seat support being, via its first end, subjected to a pressure prevailing in the first reaction chamber and, via its second end, subjected to a pressure lower than the pressure prevailing in the first reaction chamber, and in that the reaction piston and the seat support constitute, by contact between the first and second seats, a stepped assembly which, from the first end of the reaction piston towards the second end of the seat support, has an increase in section forming an annular surface subjected to the pressure of the first reaction chamber.

In a first possible embodiment of the invention, the annular surface at least partially consists of a difference in diameters of sliding of the first and second annular seals.

In a second possible embodiment of the invention, the reaction piston delimits in the secondary bore, between its first and second ends, a second reaction chamber which communicates with the first reaction chamber and that the reaction piston shuts off in a sealed manner by virtue of third and fourth annular seals which follow one another in this order in the first direction, this reaction piston also delimiting in the secondary bore, between the fourth and first annular seals, an empty chamber subjected to a pressure lower than the pressure prevailing in the first reaction chamber, and the annular surface at least partially consisting of a difference in diameters of sliding of the third and fourth annular seals.

In a third possible embodiment of the invention, the annular surface at least partially consists of a difference between the diameter of sliding of the first annular seal and the shut-off diameter between the reaction piston and the seat support.

The shut-off seats may then be formed on radial shoulders extending outwards from the reaction piston and from the seat support respectively.

A volume-compensation device will then advantageously be arranged in the space defined between the reaction piston and the seat support, it being possible for this volume-compensation device to consist of a diaphragm made of a flexible material defining a sealed compensation chamber filled with a compressible material.

The feeler, which is used to transmit the actuating force to the reaction piston, may be mounted to slide between two axial stops on the first end of the reaction piston, a return spring urging this feeler in the first direction with respect to the reaction piston.

It is also possible to contrive for the response curve of the booster equipped with the master cylinder of the invention to have, as is conventionally the case, an initial jump, by envisaging for the master cylinder with hydraulic reaction to comprise a second spring urging a moving ring in a first direction against an internal rest of the secondary bore, and for the reaction piston to comprise means for carrying along the moving ring, when this piston is moved, from a position of rest, in a direction which is the opposite direction to the first direction.

Other features and advantages of the invention will emerge clearly from the description thereof which is given hereafter by way of non-limiting indication, with reference to the appended drawings, in which.

As indicated earlier, the invention relates to a master cylinder with hydraulic reaction 1 intended to equip a pneumatic brake booster 2.

Figure 1:
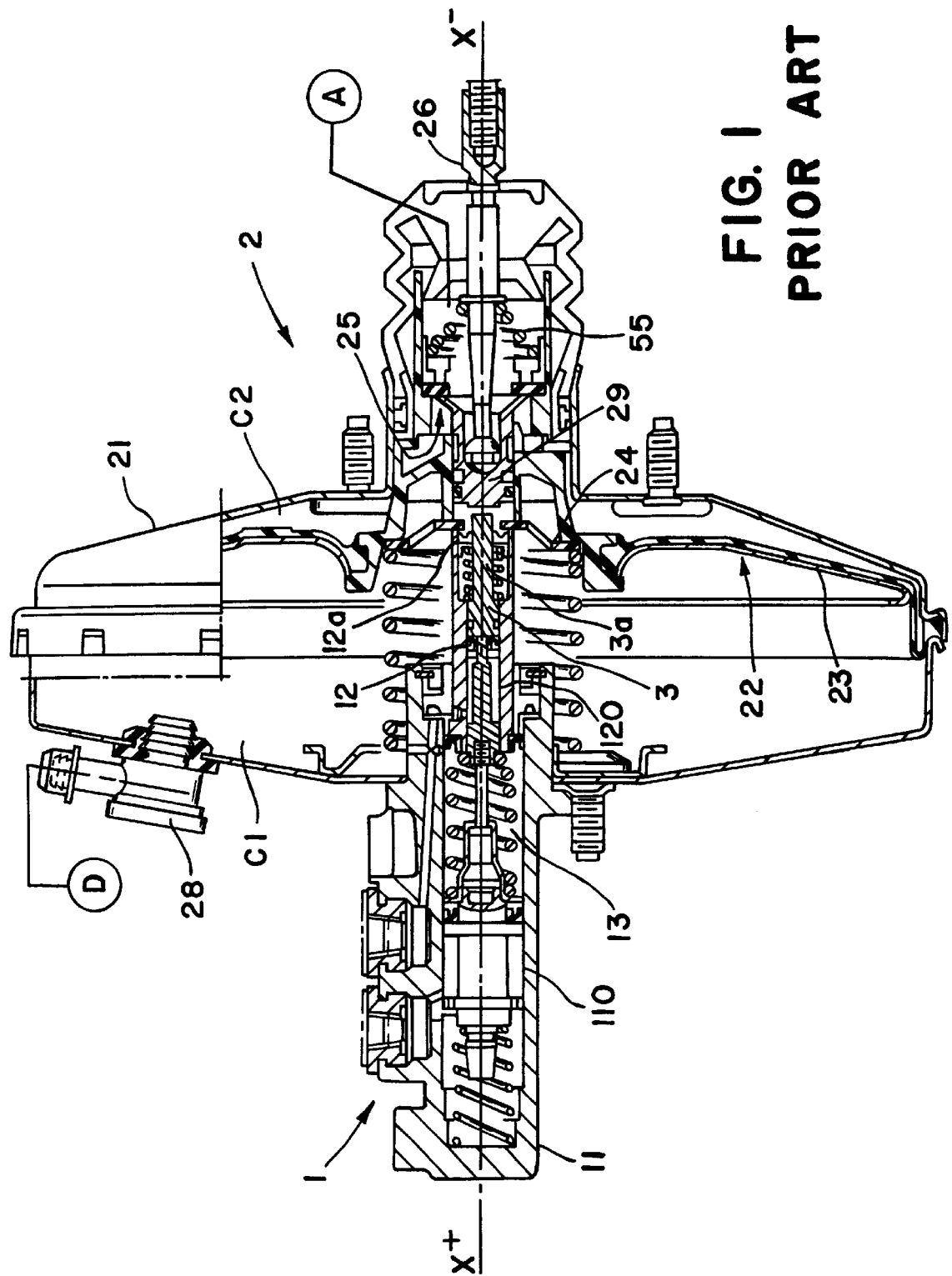
FIG. 1 is an overall sectional view of a booster incorporating a hydraulic-reaction master cylinder of the prior art.

In a way known per se, the pneumatic brake booster comprises (FIG. 1) a rigid casing 21, a moving partition 22 comprising a rigid skirt 23, a pneumatic piston 24, a three-way valve 25 and an operating rod 26 actuated by a brake pedal (not depicted).

The moving partition 22 divides the interior volume of the rigid casing 21 in a leaktight fashion into two pneumatic chambers C1 and C2 of complementary and variable volumes.

The first chamber, or front chamber C1, is connected to a low-pressure source D via a non-return valve 28, and the second chamber, or rear chamber C2, can be connected selectively, by means of the three-way valve 25, either to the low-pressure source D or to a relatively high-pressure source A, for example the atmosphere.

Thanks to this arrangement which is known per se, actuation of the three-way valve 25, which makes it possible to connect the rear chamber C2 to the second source A, causes a difference in pressure between the front and rear chambers C1 and C2, the moving partition 22 thus being urged by a force which represents the booster boost force and moving within the casing 21.

In practice, the three-way valve 25 is borne by the piston 24 and its opening to the rear chamber is controlled by the application of an actuating force in the axial direction X+ on the operating rod 26, this rod itself being borne by the piston 24 and ending in a feeler 29.

The master cylinder 1 is aligned with the operating rod 26 and essentially comprises a body 11 from which there project a main piston 12 and a reaction piston 3, this reaction piston forming part of the hydraulic reaction means which will be detailed subsequently and are more specifically covered by the invention.

The body 11 is pierced with a main bore 110, in which the main piston 12, of cylindrical shape and pierced with a stepped secondary bore 120, is mounted so that it can slide, without leaking, in order therein to delimit a working chamber 13 which during operation is subject to a hydraulic pressure.

The end 121 of the main piston 12, which end is outside the body 11, has a part against which the pneumatic piston 24 can rest, so that it can receive the boost force transmitted to this pneumatic piston 24 by the moving partition 22 as a whole and directed in the axial direction X+.

Similarly, a first end 31 of the reaction piston 3, which end is outside the body 11, has a part against which the feeler 29 can rest in order to receive the actuating force exerted by the driver in the axial direction X+ and transmitted through the operating rod 26.

The other end 32 of the reaction piston 3 is mounted so that it can slide, without leaking, by virtue of a first annular seal 81, in the secondary bore 120 in order therein to delimit a reaction chamber 4 which communicates with the working chamber 13, for example via ducts such as 124.

Bearing in mind the delay with which the boost force is developed as compared with the actuating force in the event of abrupt braking, the reaction piston 3 can move, with respect to the main piston 12, through a travel with minimum amplitude K when the temporal variation in actuating force exceeds a given threshold, above which braking can be considered to be emergency braking.

The hydraulic-reaction means which more particularly form the subject-matter of the invention (FIGS. 2, 3 and 4) especially comprise, in addition to the reaction piston 3, a first shut-off seat 41, a second shut-off seat 42 and at least a first spring 51.

The first shut-off seat 41, which is formed on a front face 33 of the second end 32 of the reaction piston 3 is intended to co-operate with the second shut-off seat 42 which is mounted at a first end 7a of a seat support 7 arranged in the reaction chamber 4.

Figure 2:
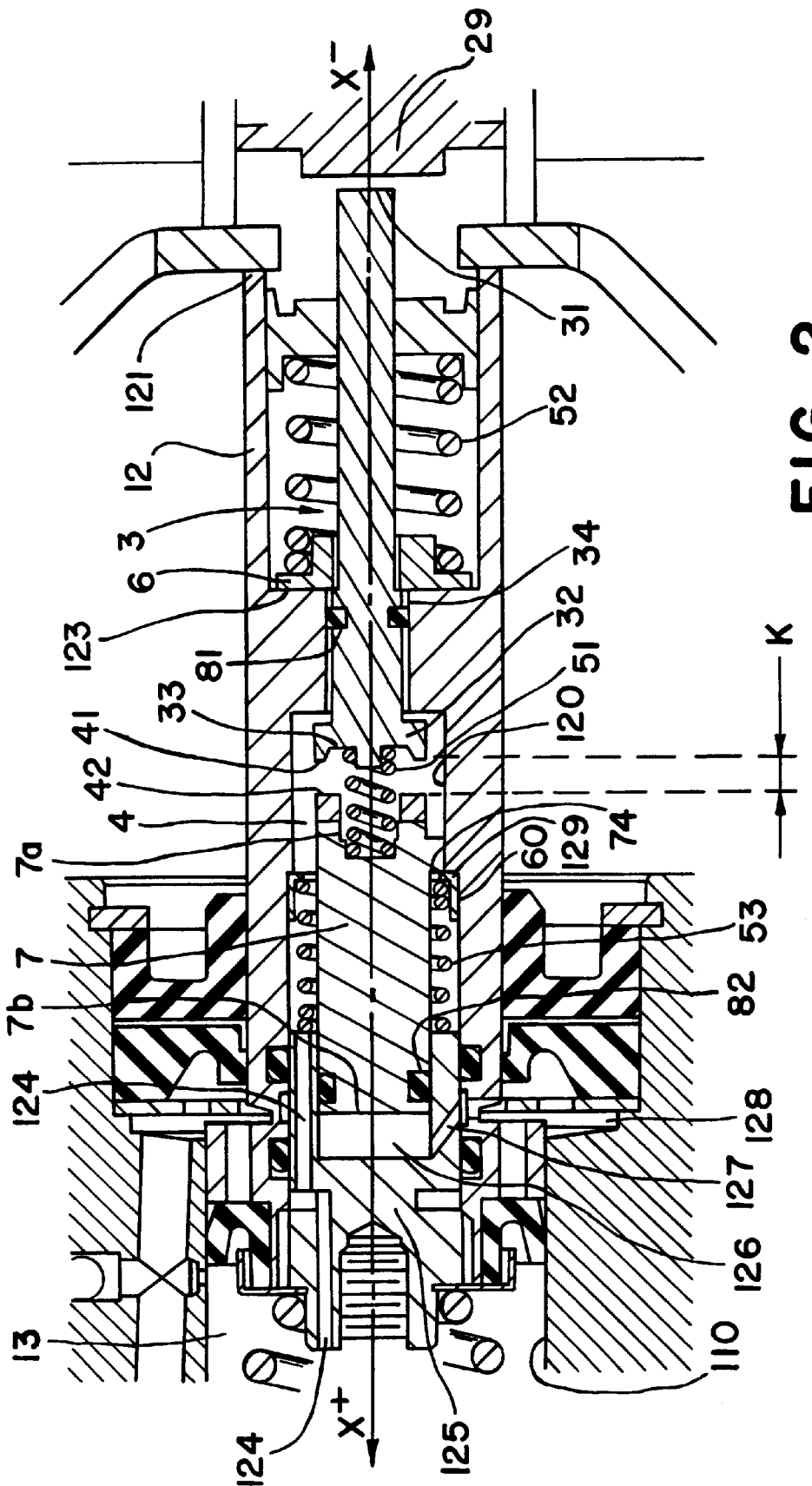
FIG. 2 is an enlarged sectional view of a master cylinder in accordance with a first embodiment of the invention.
Figure 3:
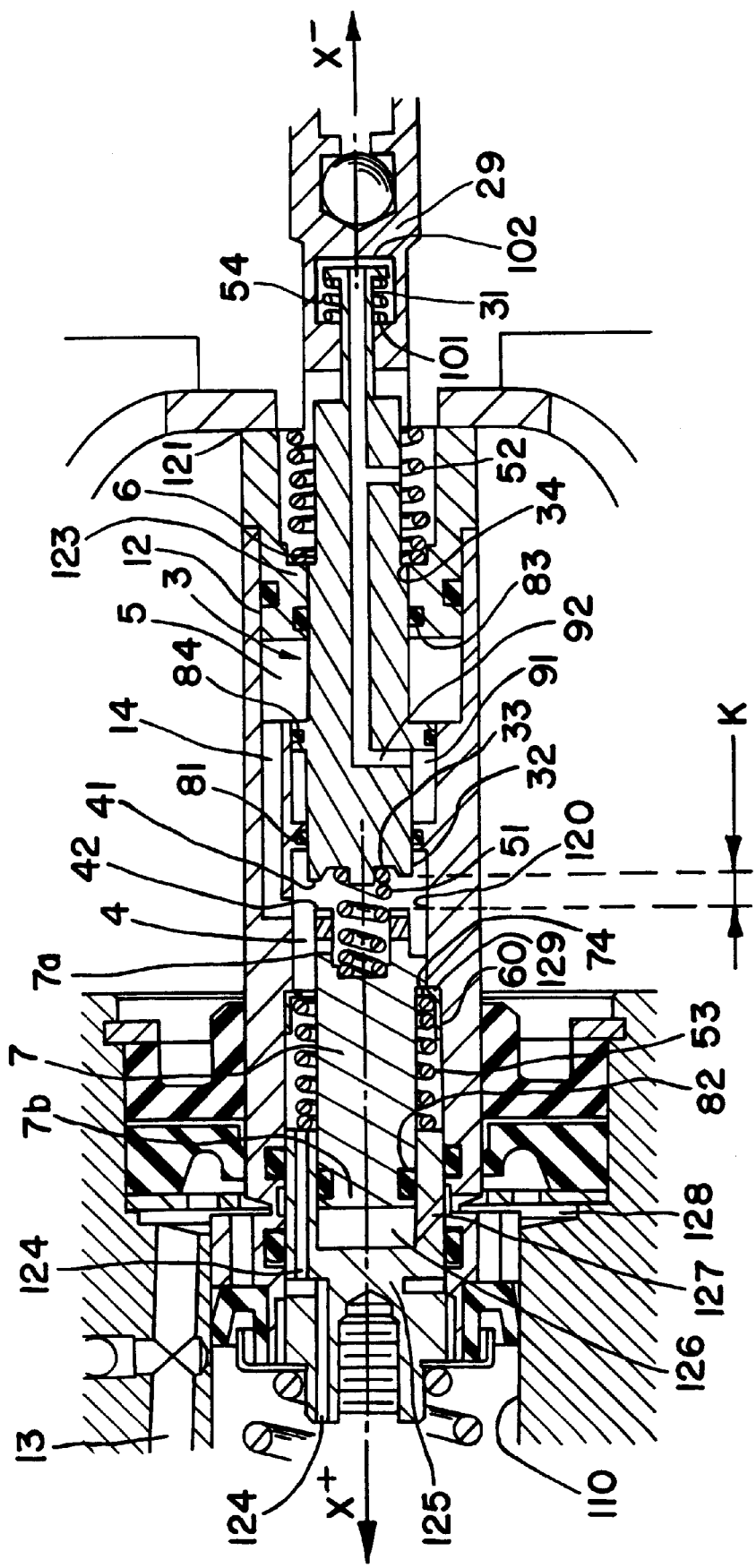
FIG. 3 is an enlarged sectional view of a master cylinder in accordance with a second embodiment of the invention.
Figure 4:
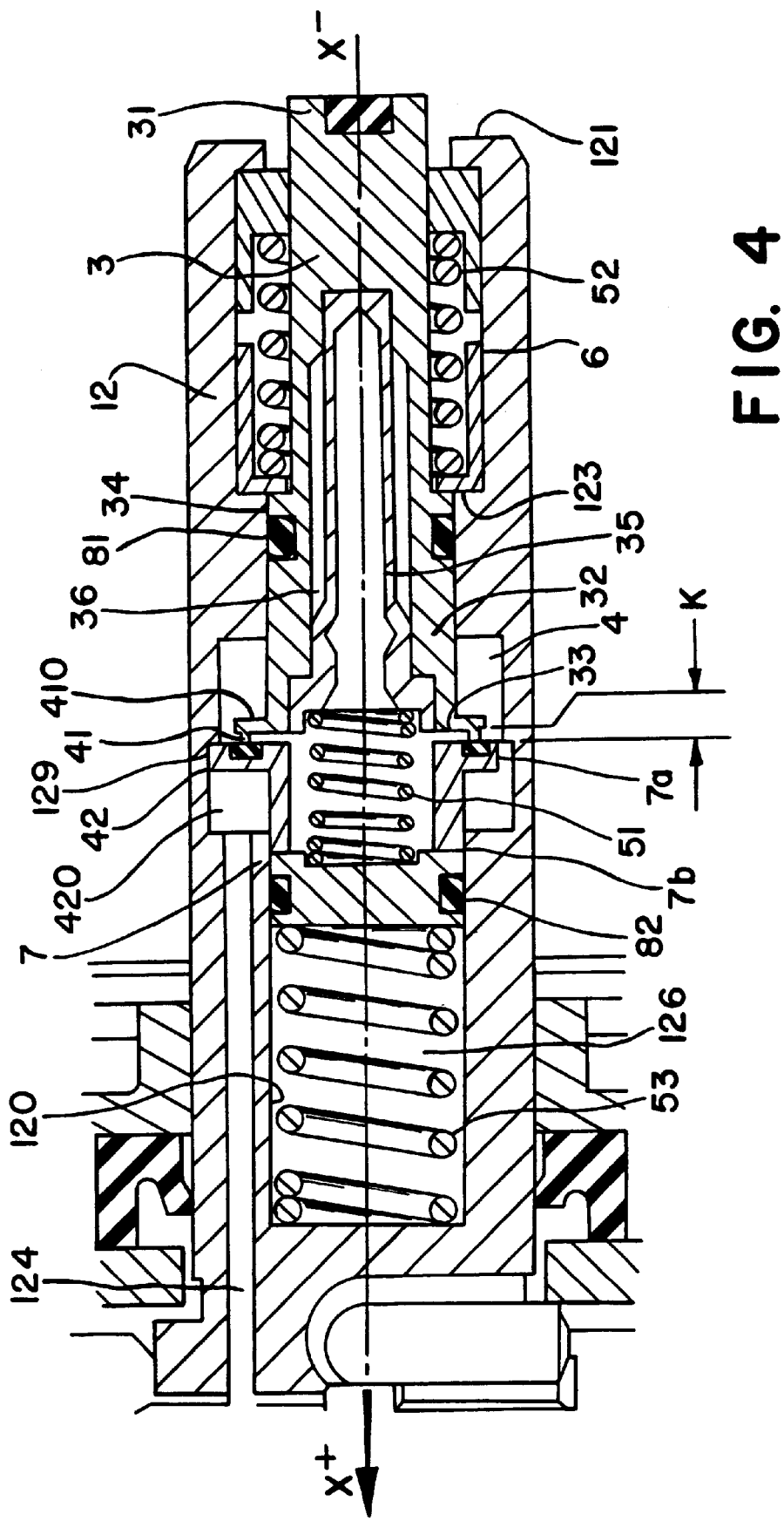
FIG. 4 is a diagrammatic sectional view of a master cylinder in accordance with a third embodiment of the invention.

The maximum distance separating the first shut-off seat 41 from the second shut-off seat 42, that is to say, in practical terms, the distance separating these two seats when the master cylinder is in the position of rest, as depicted in FIGS. 2, 3 and 4, is at most equal to the travel K, so as to allow the first seat 41 to bear against the second seat 42 in emergency braking situations.

The first spring 51, which has the function of urging the reaction piston 3 in a direction that tends to move the first shut-off seat 41 away from the second shut-off seat 42, is, for example, a spring that works in compression and is fitted between the seat support 7 and the reaction piston 3.

The seat support 7, the first end 7a of which bears the second shut-off seat 42 is, via its second end 7b, mounted to slide, without leaking by virtue of a second annular seal 82, in the main piston 12, for example in a fixed end piece 125 of this piston 12, through which piece the ducts 124 pass (FIGS. 2 and 3).

The seat support 7 thus defines, in the main piston 12, a chamber 126 which is placed in communication, via a passage 127, with an annular space 128 subject to atmospheric pressure, as has been depicted in FIGS. 2 and 3, or is itself filled with air at atmospheric pressure in the position of rest, as has been depicted in FIG. 4.

This being the case, the seat support 7 is, via its first end 7a, subjected to the pressure prevailing in the reaction chamber 4, whereas via its second end 7b, it is subjected only to atmospheric pressure, that is to say an appreciably constant pressure lower than the pressure prevailing in the reaction chamber 4, and in practice negligible compared with the latter pressure.

It may also be advantageous, in order to reproduce the known brake pedal feel, to provide a second spring 52 urging a moving ring 6 in the direction X+ against an internal rest 123 in the secondary bore, the reaction piston 3 comprising means, such as a shoulder 34, for carrying along the moving ring 6 when this piston is moved, from its position of rest depicted in FIGS. 2, 3 and 4, in the direction X− which is the opposite direction to the actuating direction X+.

A third, pre-loaded, spring 53, which acts in the opposite direction X− on a ring 60 co-operating with a shoulder 74 of the seat support 7 and with a stop 129 of the main piston 12, is preferably provided so as to place the second shut-off seat 42 at the distance K from the first shut-off seat 41 when the master cylinder is in the rest condition, as has been depicted in FIGS. 2 and 3. In the embodiment of FIG. 4, the third spring 53 urges the seat support 7 directly against the stop 129 of the main piston 12, the particular design of this embodiment making it possible to dispense with the ring 60.

The way in which the master cylinder hitherto described works is as follows.

If an actuating force which varies relatively slowly is applied to the operating rod 26, the driving-in of the feeler 29 causes the valve 25 to open and therefore lets atmospheric air into the rear chamber C2 before the reaction piston 3 has been able to press the shut-off seat 41 against the second seat 42.

This being the case, the moving partition 22 exerts on the end 121 of the main piston 12 a boost force which moves the main piston in the direction X+ and opposes any relative movement between the reaction piston 3 and the main piston 12 in the direction X+ and therefore prevents contact between the seats 41 and 42.

In this operating mode, the hydraulic pressure prevailing in the working chamber 13 and in the reaction chamber 4, and which is therefore exerted on the entire cross-section of the end 32 of the reaction piston 3, ends up pushing the reaction piston 3 and the ring 6 back, compressing the spring 52, and thus causes a reaction force to appear on the feeler 29, the size of this force being that of the reaction forces conventionally employed in known boosters.

If an actuating force that varies relatively rapidly is applied to the operating rod 26, then the reaction piston 3, by contrast, allows the first shut-off seat 41 to bear against the second seat 42 before atmospheric air can be let into the rear chamber C2 in sufficient quantity to make the moving partition 22 exert on the end 121 of the main piston 12 a boost force that is capable of moving the main piston in the direction X+ and of taking up the movement of the reaction piston 3.

Now, as in this case the first and second seats 41, 42 are pressed one on the other, the reaction piston 3 and the seat support 7 therefore form one and the same assembly.

According to an essential feature of the present invention, the assembly that the reaction piston 3 and the seat support 7 thus form through the contact between the seats 41 and 42 is a stepped assembly and has, in the actuating direction X+ between the reaction piston 3 and the seat support 7, an increase in cross-section forming an annular surface subject to the pressure of the first reaction chamber 4.

In a first embodiment of the invention, illustrated in FIG. 2, the annular surface subjected to the pressure of the first reaction chamber 4 consists in a difference of diameters of sliding of the first and second annular seals 81, 82.

More specifically, as the annular seals 81 and 82 both slide at their periphery (FIG. 2), that is to say in the region defined by their respective outside diameters, and as the second seal 82 has an outside diameter that exceeds the outside diameter of the first seal 81, the hydraulic pressure prevailing in the working chamber 13 and in the reaction chamber 4 exerts on the assembly 3, 7 a force directed in the direction X+ and proportional to the difference in surface areas delimited by the seals 82 and 81, it also being possible for the hydraulic pressure in this reaction chamber 4, above a certain value, to stick the first and second seats 41 and 42 one on the other.

The force thus exerted by the pressure prevailing in the reaction chamber 4 therefore combines with the actuating force exerted by the driver and thus compensates for any decrease in the latter force, at least for as long as this decrease is not such that it causes the valve 25 to close and the booster to return to its position of rest.

In a second embodiment of the invention, illustrated in FIG. 3, the reaction piston 3 delimits in the secondary bore 120, between its first and second ends 31, 32, a second reaction chamber 5 which communicates with the first reaction chamber 4 for example via a duct 14, this second reaction chamber 5 being closed off in a sealed manner by the reaction piston by virtue of third and fourth annular seals 83, 84 which follow on from one another in this order in the first direction X+.

The reaction piston 3 also delimits, within the secondary bore 120 and between the fourth and first annular seals 84, 81, an empty chamber 91, the annular surface then at least partially consisting of a difference in diameters of sliding of the third and fourth annular seals 83, 84.

The empty chamber 91 may, for example, contain air or be placed in communication, via an orifice 92, with the front chamber of the booster, the essential feature being that it should be subjected to a pressure that is lower than the pressure prevailing in the first reaction chamber 4.

This being the case, all that is required is for the third seal 83 to have an inside diameter smaller than the outside diameter of the fourth seal 84 and/or for the inside diameter of the first seal 81 to be smaller than the outside diameter of the second seal 82 so that the previously-defined annular surface should occur and so that the assembly 3, 7 should receive, from the pressure prevailing in the reaction chamber 5, a thrust directed in the direction X+ which combines with the actuating force and is capable of compensating for any possible decrease therein.

In a third embodiment of the invention, illustrated in FIG. 4, the annular surface subjected to the pressure of the first reaction chamber 4 consists of a difference between the sliding diameter of the first annular seal 81 and the shut-off diameter between the reaction piston 3 and the seat support 7, and equal to the outside diameter of the shut-off seats 41 and 42.

It can be seen from FIG. 4 that the shut-off seats 41 and 42 are formed respectively on radial shoulders 410 and 420 extending out from the reaction piston 3 and from the seat support 7, respectively, into the reaction chamber 4, which is itself in part formed between two shoulders of the stepped bore 120 of the main piston 12.

Thus, as in the previous embodiments, the annular seal 81 slides via its periphery in a reduced-diameter portion of the bore 120, while the shut-off seats 41 and 42 are in contact with one another over a diameter that exceeds that of the annular seal 81.

The hydraulic pressure prevailing in the working chamber 13 and in the reaction chamber 4 exerts on the assembly 3, 7 a force that is directed in the direction X+ and is proportional to the difference between the surface areas delimited by the seal 81 and the shut-off seats 41 and 42, the hydraulic pressure in the reaction chamber also pressing the seats 41 and 42 one onto the other all the more firmly.

In order not to disturb the pressing of the seats 41 and 42 one onto the other, and to allow this contact to remain sealed, it is advantageously possible to provide a device for compensating for volume in the space delimited by the reaction piston 3/seat support 7 assembly.

Such a volume-compensation device consists, in the embodiment of FIG. 4, of a diaphragm 35 made of a flexible material, for example an elastomer, of tubular overall shape fixed at both ends to the reaction piston 3, so as to delimit a sealed compensating chamber 36 filled with a compressible material such as air. In that way, the variation in the volume between the reaction piston 3 and the seat support 7, which occurs between the time that the seats 41 and 42 come into contact with one another and the time that the travel K has been covered, is compensated for by the deformation of the diaphragm 35 and by the compression of the chamber 36.

The pressure prevailing in the reaction chamber 4 thus generates on the reaction piston 3/seat support 7 assembly a force which combines with the actuating force exerted by the driver, this additional force thus compensating for any decrease in actuating force, at least for as long as this decrease is not such that it causes the valve 25 to close and the booster to return to the position of rest.

As FIG. 3 shows, it may also be advantageous, irrespective of which embodiment is chosen, to contrive for the feeler 29 to slide between two axial stops 101, 102 on the first end 31 of the reaction piston, a return spring 54 being provided to urge the feeler in the first direction X+ with respect to the reaction piston.

By virtue of such an arrangement, the force exerted by the spring 54 (FIG. 3) when the feeler 29 tends to return to its position of rest under the effect of the return spring 55 (FIG. 1) after an abrupt application of the brakes, subtracts from the return force exerted by this spring 55 and therefore delays the return of the booster to the rest condition when the driver has not clearly demonstrated his desire to stop braking by completely relaxing his braking effort.

What is claimed is:

1. Master cylinder with hydraulic reaction for a pneumatic brake booster, comprising:

a body (11) pierced with a main bore (110);

a cylindrical main piston (12) pierced with a secondary bore (120), and of which one end (121), outside the body, can receive a boost force directed in a first direction (X+), this main piston being mounted so that it can slide, without leaking, in the main bore in order therein to delimit a working chamber (13) which during operation is subjected to a hydraulic pressure; and a reaction piston (3) of which a first end (31), outside the body, is capable of receiving an actuating force directed in the first direction (X+), and of which a second end (32) is mounted so that it can slide, without leaking, by virtue of a first annular seal (81), in the secondary bore (120) in order therein to delimit at least a first reaction chamber (4) that communicates with the working chamber (13), the reaction piston (3) being capable of moving, with respect to the main piston (12), through a travel (K) of non-zero minimum amplitude for an actuation force gradient that exceeds a given threshold;

characterized in that it further comprises: a first shut-off seat (41) formed on a front face (33) of the second end (32) of the reaction piston (3); a second shut-off seat (42) mounted at a first end (7a) of a seat support (7) placed in the first reaction chamber (4), at a distance from the first shut-off seat (41) that is at most equal to the said minimum-amplitude travel; and at least a first spring (51) urging the reaction piston (3) in a direction likely to move the first shut-off seat (41) away from the second shut-off seat (42), in that the seat support (7) has a second end (7b) sliding, without leaking, in the main piston (12) by virtue of a second annular seal (82), this seat support being, via its first end (7a), subjected to a pressure prevailing in the first reaction chamber (4) and, via its second end (7b), subjected to a pressure lower than the pressure prevailing in the first reaction chamber (4), and in that the reaction piston (3) and the seat support (7) constitute, by contact between the first and second shut-off seats (41, 42), a stepped assembly which, from the first end (31) of the reaction piston towards the second end (7b) of the seat support (7), has an increase in section forming an annular surface subjected to the pressure of the first reaction chamber (4).

2. Master cylinder with hydraulic reaction according to claim 1, characterized in that the annular surface at least partially consists of a difference in diameters of sliding of the first and second annular seals (81, 82).

3. Master cylinder with hydraulic reaction according to claim 1 or 2, characterized in that the reaction piston (3) delimits in the secondary bore (120), between its first and second ends (31, 32), a second reaction chamber (5) which communicates with the first reaction chamber (4) and that the reaction piston shuts off in a sealed manner by virtue of third and fourth annular seals (83, 84) which follow one another in this order in the first direction (X+), in that the reaction piston (3) delimits in the secondary bore (120), between the fourth and first annular seals (84, 81), an empty chamber (91) subjected to a pressure lower than the pressure prevailing in the first reaction chamber (4), and in that the annular surface at least partially consists of a difference in diameters of sliding of the third and fourth annular seals (83, 84).

4. Master cylinder with hydraulic reaction according to claim 1, characterized in that the annular surface at least partially consists of a difference between the diameter of sliding of the first annular seal (81) and the shut-off diameter between the reaction piston (3) and the seat support (7).

5. Master cylinder with hydraulic reaction according to claim 4, characterized in that the shut-off seats (41, 42) are formed on radial shoulders (410, 420) extending outwards from the reaction piston (3) and from the seat support (7) respectively.

6. Master cylinder with hydraulic reaction according to claim 5, characterized in that a volume-compensation device is arranged in the space defined between the reaction piston (3) and the seat support (7).

7. Master cylinder with hydraulic reaction according to claim 6, characterized in that the volume-compensation device consists of a diaphragm (35) made of a flexible material defining a sealed compensation chamber (36) filled with a compressible material.

8. Master cylinder with hydraulic reaction according to any one of the preceding claims, characterized in that the actuating force is transmitted to the reaction piston (3) by a feeler (29), in that the feeler is mounted so that it can slide between two axial stops (101, 102) on the first end (31) of the reaction piston, and in that a return spring (54) urges the feeler in the first direction (X+) with respect to the reaction piston.

9. Master cylinder with hydraulic reaction according to any one of the preceding claims, characterized in that it comprises a second spring (52) urging a moving ring (6) in the first direction (X+) against an internal rest (123) in the secondary bore, and in that the reaction piston (3) comprises means (34) for carrying along the moving ring (6), when this piston is moved, from a position of rest, in a second direction (X−) which is the opposite direction to the first direction (X+).

* * * * *